3,057,022
Patented Oct. 9, 1962

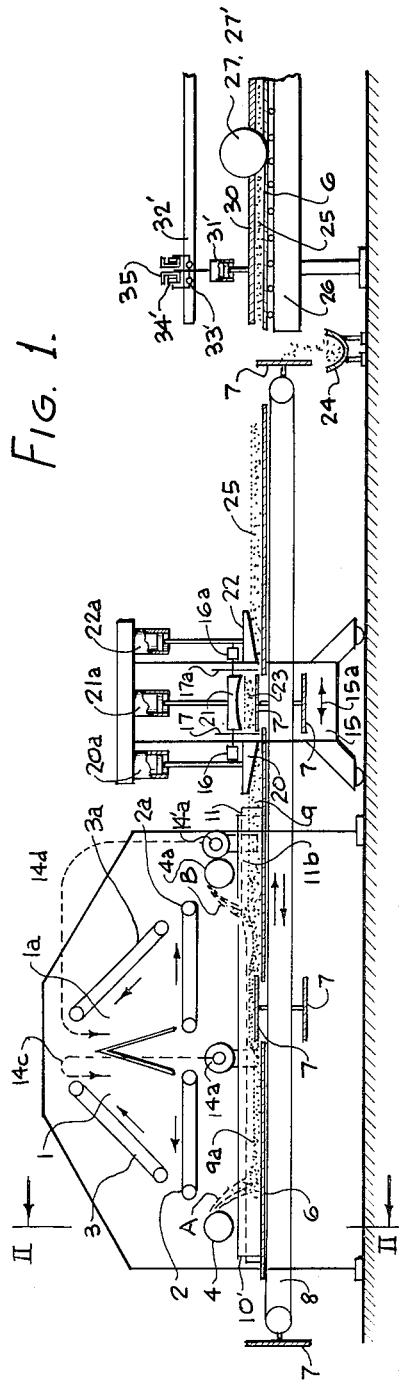

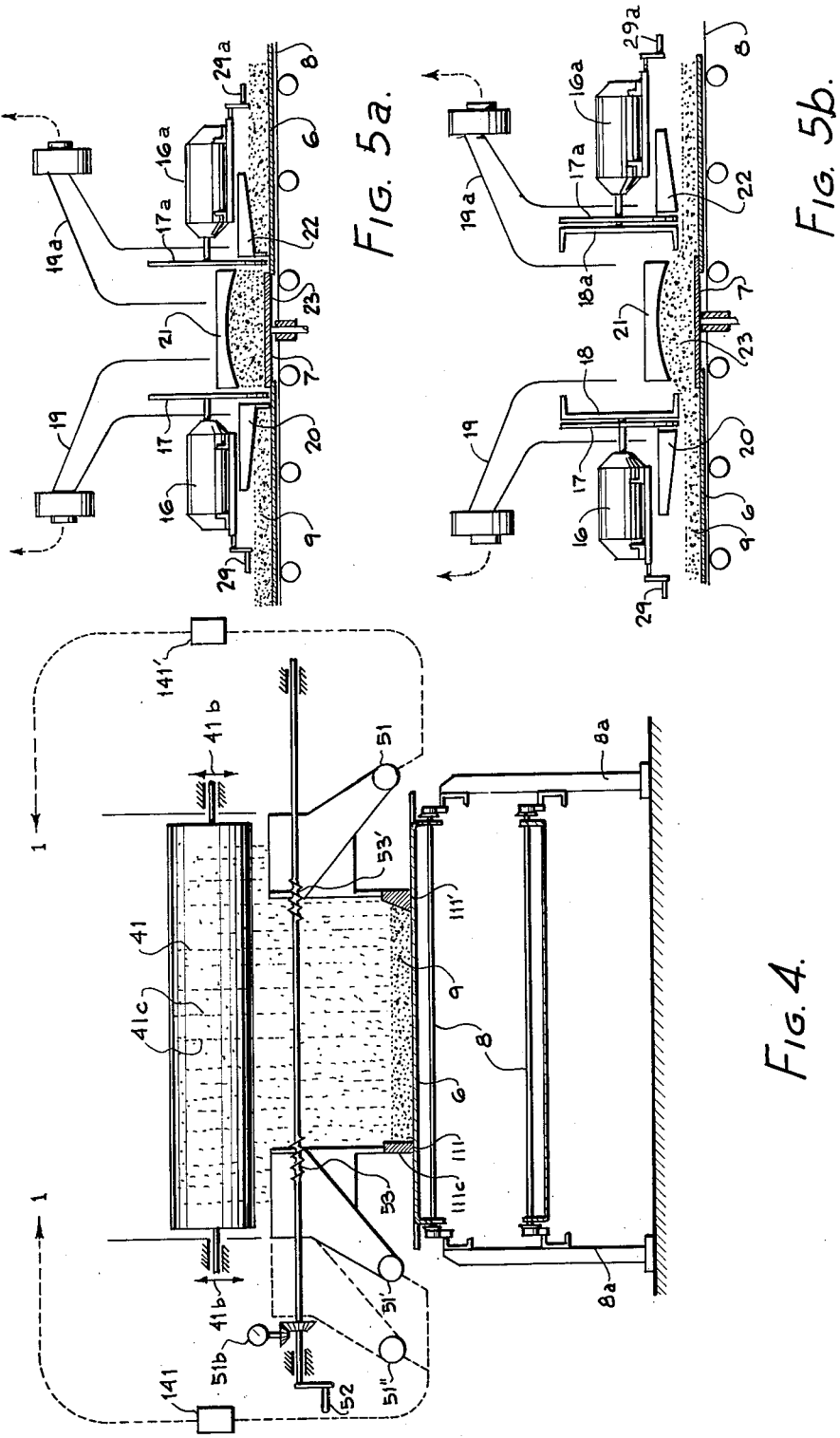

3,057,022
FORMING APPARATUS FOR MANUFACTURE OF WOOD COMPOSITION PANELS OR SIMILAR PRODUCTS
Ernst Bär, Bad Wiessee (Tegernsee), and Walter Henker, Darmstadt, Germany; said Henker assignor to said Bär
Filed Mar. 20, 1959, Ser. No. 800,741
Claims priority, application Germany Mar. 22, 1958
17 Claims. (Cl. 19—155)

Our invention relates to mat-forming apparatus for the manufacture of panels and other bodies from binder-containing wood particles or other pourable particle stock. Such forming apparatus comprise particle feeder devices which pour or spread the wood shavings or other particle stock onto the traveling surface of a conveyor to produce thereon a mat or fleece which the conveyor passes to the subsequent fabricating stations, such as a panel press for hot pressing and curing the mat. On its passage from the forming apparatus to the panel press, the mat may be subdivided by transverse cutting and edge trimming into mat portions of given dimensions.

It is known to perform such manufacture of pressed wood-composition panels or similar products by a continuous particle pouring method. In most cases, the binder-containing particles are deposited upon the forming conveyor either in a single layer or in a plurality of layers of qualitatively different, or essentially similar particle stock so as to form an endless mat of a given width which, after being prepressed in some cases, enters into a heated panel press where the mats or mat portions are converted into the solidified product. In such continuous operations there has been a considerable amount of waste resulting from excessive amounts of particle stock that become eliminated from the original mat particularly by the edge trimming devices. This disadvantage makes itself felt particularly in cases where one and the same forming equipment is used for producing particle mats of respectively different widths, such as can be done by providing the apparatus with lateral wall boards that are displaceable in the transverse direction for setting them to the desired width of the mat.

It is an object of our invention to improve the economy of operation, particularly in manufacturing plants where a mat forming apparatus is used for the production of panels of respectively different widths.

According to our invention, we provide, at the longitudinal sides of the particle receiving zone on the forming conveyor, a collecting device in which the particle stock deposited onto the forming conveyor beyond the width of the desired mat is collected, and we further provide the collecting devices with conveying means that entrain the particle stock and return it to the particle storage or particle-feeder means of the forming apparatus.

According to a more specific feature of our invention, the particle collecting devices, located longitudinally on both sides of the mat-receiving conveying zone, consist of trough-shaped structures that are adjustable in width for adapting them to the desired width of the mat.

According to another feature of our invention, the lateral stock collecting devices consist of funnel-shaped structures that can be displaced in the transverse direction of the forming conveyor for the purpose of adjusting the desired width of the mat to be produced.

The above mentioned and more specific advantages and features of our invention will be apparent from the following description in conjunction with the drawings on which embodiments of mat-forming apparatus according to the invention are shown by way of example; although it should be understood that the invention is not limited to the particular type and design of the forming equipment presented for the purpose of exemplification.

FIG. 1 shows schematically a front view of a forming station provided with trough-shaped collecting devices.

FIG. 2 is a cross section on enlarged scale along the line II—II shown in FIG. 1.

FIG. 3 is a lateral view of another forming station which is equipped with funnel-shaped collecting devices.

FIG. 4 is a cross section on enlarged scale taken along the line IV—IV in FIG. 3.

FIG. 5a shows on enlarged scale a transverse cutting device which forms a portion of FIG. 1, and FIG. 5b shows the same device somewhat modified.

Figure 6A:
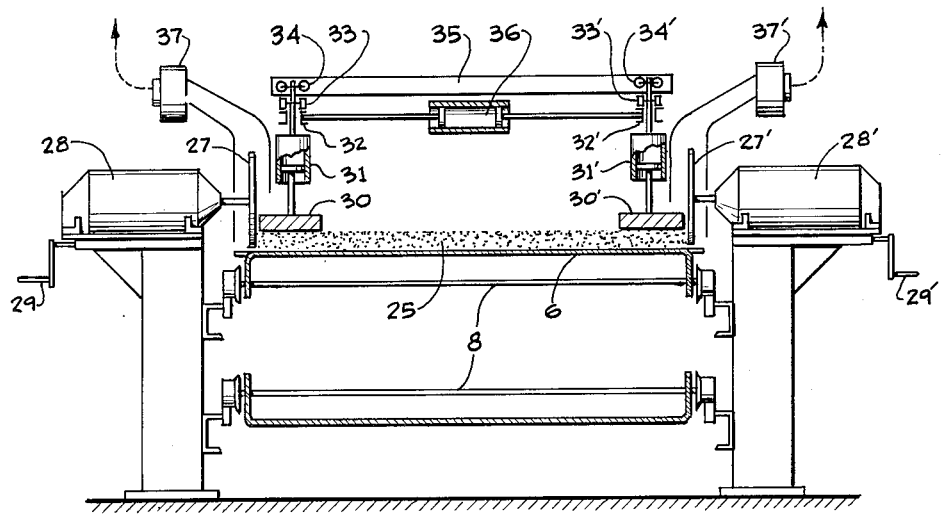
FIG. 6a is a more detailed illustration on enlarged scale of an edge trimming device which forms another portion of FIG. 1

The mat-forming station shown in FIGS. 1 and 2 serves for the production of interfelted mats and mat portions from pourable wood particle stock previously coated or impregnated with an adhesive binder such as a thermosetting plastic. The particle stock is stored in chambers 1, 1a whose respective bottoms are formed by horizontal feeder conveyors 2, 2a each comprising an endless belt traveling in the direction indicated by an arrow. The front of each storage chamber is bordered by upwardly inclined endless-belt scrapers 3, 3a traveling in the direction indicated by an arrow. During operation, the stock material passes through the two opposite horizontal gaps between conveyors 2 and 3 onto distributing rollers 4, 4a whose height is adjustable as is indicated schematically in FIG. 2 by double-headed arrows 4b. The rollers 4 and 4a spread or distribute the particle stock at an adjusted rotating speed onto the horizontal top surface of an endless forming conveyor 8, the two streams of particle stock being schematically indicated at A and B. The forming conveyor 8 is preferably covered with a sequence of cauls 6, preferably of sheet metal, which are spaced from each other in the longitudinal direction of the forming conveyor, the gap between each two cauls being covered by a cover sheet 7 attached to the conveyor belt 8.

As the horizontal top surface of the forming conveyor 8 with the caul sheets travels toward the right, the roller 4 spreads a first layer onto the cauls, and the roller 4a covers the bottom layer with a top layer of stock material, thus forming a mat which travels to the next fabricating devices in the forming stations described in a later place. The wood particles of each stream A, B cover the cauls 6 as well as the cover sheets 7 bridging the gap between each two cauls on the endless belt of the forming conveyor 8, thus producing a virtually uninterrupted deposition of particles 9a over the entire width of conveyor 8.

It should be understood that the particular design of the particle depositing means, as well as the particular design of the forming conveyor are not essential to the present invention proper and hence may greatly differ from those illustrated and described above for the purpose of exemplification. The particular stock-storing and spreading means herein described are substantially in accordance with those more fully disclosed in U.S. Patent No. 2,737,997 (FIG. 4); and the design of the forming conveyor provided with cover sheets to close the gap between successive caul sheets is in accordance with the one more fully disclosed in Austrian Patent No. 188,495.

However, the forming station according to the invention differs essentially from those previously known in that it is provided with trough-shaped catching devices 5, 5' (FIG. 2) which extend along both longitudinal sides of the forming conveyor 8 within the stock-depositing zone of the distributor rollers 4, 4a. The width of each trough device 5, 5' is adjustable and thus can be set for any desired width of the mat to be produced. The trough devices operate to collect or intercept the amount of stock material spread or dispensed by the distributor rollers beyond the desired width of the mat.

The collecting or catching troughs greatly improve the economy of forming stations for the production of mats of adjustable width because, without such troughs, the material distributed beyond the desired width could be returned into the fabricating operation only with considerable effort and loss. By virtue of the adjustability of the trough devices, more fully described below, it is readily possible to set the desired mat width at will while simultaneously changing the width of the respective troughs so as to eliminate any waste.

The two trough-shaped collecting devices 5, 5' have outer walls formed by respective wall boards 10, 10' (FIG. 2) which are rigidly mounted on the stationary frame structure 8a of the feeder conveyor. The trough devices further comprise an adjustable inner wall 11, 11'. The inner walls are displaceable transverse to the traveling direction of the feeder conveyor, for example by means of a crank 12 which carries two worms 13, 13' in threaded engagement with respective nut members attached to the inner walls 11, 11'. By operating the crank 12, the two inner walls 11 and 11' can be adjusted relative to each other to a spacing corresponding to the desired width of the mat to be produced. The mat width thus adjusted at any time may be indicated by an indicator connected with the traveling nuts at 13, 13', or by an indicator connected with the crankshaft as schematically shown at 51b in FIG. 4. Each trough space is thus formed between the fixed wall or wall board 10 or 10' and the selectively positioned wall 11 or 11', the bottom of each trough space being formed by a marginal area on the feeder conveyor 8 and the caul sheets 6.

It is in some cases desirable to have the wood particles pile up to a somewhat greater height at the longitudinal edges of the mat than in the middle portion for the purpose of obtaining higher strength in the marginal areas. To do this, the inner walls of the trough structures are pivotally displaceable about their longitudinal axis, for example manually, or they are given an upwardly tapering shape, the former design being applied to the inner wall 11, and the latter design of a wedge-shaped cross section being embodied in wall 11' (FIG. 2). Preferably, the inner walls 11, 11' are given a height which gradually or stepwise increases from the left toward the right (FIG. 1) up to the maximum poured height of the mat 9, as is shown by the broken line 11b in FIG. 1.

The stock material collecting in the trough devices 5, 5' is withdrawn therefrom by suitable conveying means, such as the pneumatic conveyors shown at 14 and 14' in FIG. 2 and at 14'a in FIG. 1. These conveying means return the collected excess material back to the storage chambers 1 and 1a, as is indicated in FIG. 1 by broken lines 14c and 14d.

The forming station illustrated in FIGS. 3 and 4 differs from the one described above in that the stock collecting devices on the longitudinal sides of the forming-conveyor means 6, 7, 8 consist essentially of funnel-shaped collecting boxes.

As in the embodiments of FIGS. 1, 2, the particle storing chambers 1, 1a, are each formed by a feeder conveyor 21 or 21a and an endless scraper belt 31 or 31a. The particle material dispensed from the storage chambers is distributed by means of respective spreader rollers 41 and 41a whose height above the forming conveyor is adjustable, as is indicated by the double-headed arrows 41b in FIG. 4, already mentioned above.

The rotating speed of the rollers 41, 41a is preferably adjustable in order to thereby control the spreading range of the particle stock deposited upon the forming conveyor. Located on each longitudinal side of the forming conveyor are two funnel-shaped collecting boxes, three of which are visible at 51, 51', 51a. Displacing devices 52, 53, similar to those described above with reference to FIG. 2, are provided for shifting the collecting funnels together with the width-limiting side boards 111, 111' to repsective positions corresponding to the desired width of the mat to be produced. As mentioned above, the displacing devices are provided with an indicator 51b from which the adjusted width of the mat can be read off.

Pneumatic conveyor devices 141, 141', 141'a remove the particle material from the collecting funnels and return it to the storage chambers 1, 1a. The longitudinal boards 111, 111' may be made displaceable about their longitudinal axis 111c (FIG. 4) or may be given a cross section shaped as an upwardly tapering wedge, as shown at 111' (FIG. 4). The height of these boards may increase from one side to the other, as explained above with reference to FIG. 1 and indicated by the broken line 111b in FIG. 3.

If desired, the excess amount of stock material collected in the troughs, funnels, or other collecting devices, may be returned to different storage chambers or bins so as to remain separated as regards quality or size. For example, the wood shavings that are to form the surface layers of the finished panel and for that reason have often better quality than the particles in the interior, can be conveyed from the collecting devices to a special storage bin or chamber for such high-quality shavings, whereas the other particles, such as those used in the interior of the mat, are separately conveyed to a different storage chamber or bin.

The devices for pre-pressing and finally pressing the mat do not form part of the forming station according to the invention, and for that reason are not illustrated and further described herein. The mat coming from the forming station may be supplied to the pressing station as an endless strand, or may be previously subdivided into mat pieces of given length. The latter operation is generally necessary if a multiplaten press is used for producing the finished articles, such as wood-composition panels.

For such subdivision of the mat, the forming station is provided with a transverse cutter unit 15 (FIGS. 1, 5a, 5b) by means of which the endless mat, during forward travel, is severed into pieces of predetermined length.

The entire unit 15 is movable along the forming conveyor 8, as is indicated by a double-headed arrow 15a in FIG. 1. The unit 15 operates to transversely cut the mat while advancing at the same speed and in the same direction as the mat traveling on the forming conveyor 6. After a transverse cut is completed, the cutter unit 15 is more rapidly returned to the starting position before making another transverse cut.

As apparent from FIGS. 5a and 5b, the unit 15 comprises two circular saws 17, 17a which are located coaxially opposite each other and are provided with respective drive motors 16, 16a. The saws are shown provided with pneumatic or exhaust devices 19, 19a for eliminating the waste particles resulting from the cutting operation. The cutter unit is further provided with pressure beams or platens 20, 21, 22, which may be operated hydraulically such as by the hydraulic cylinders shown at 20a, 21a, 22a, in FIG. 1.

These saws 17, 17a (FIGS. 5a, 5b) can be displaced relative to each other by means of respective cranks 29, 29a in a direction parallel to the longitudinal axis of the forming conveyor, so that the length of the mat pieces 23 being cut can be adjusted as desired. At the beginning of the cutting operation the pressure beams 20, 21, 22 are lowered upon the completed mat 9 in such a manner that during the sawing operation the pressure beam 21 rests upon the mat portion located on a cover sheet 7, whereas pressure beams 20 and 22 are placed upon the marginal zones of the mat portion resting on two adjacent caul sheets 6, respectively. If the cut is to be made, not along respective lines close to the two sides of a cover sheet 7, but at a greater distance therefrom, then the cutting tools or circular saws are preferably combined with auxiliary devices, for example centrifugating wheels 18, 18a (FIG. 5b) of suitable width which fling all material away that is located between the outer pressure beams 20, 22 and the middle pressure beam 21.

The material resulting as waste from the transverse cutting operation according to FIG. 5a or 5b is collected and returned into the fabricating process by the pneumatic conveying devices 19 and 19a. The stock material 23 remaining upon the cover sheets 7 is emptied into a conveyor trough 24 (FIG. 1) at the reversing point of the feeder conveyor 8. The conveying trough 24 returns the collected excess material back into the fabricating process. From the forming conveyor 8, the individual mat pieces 25, as well as the appertaining caul sheet 6 pass upon another conveyor 26, such as a roller conveyor, for further processing.

Figure 6B:
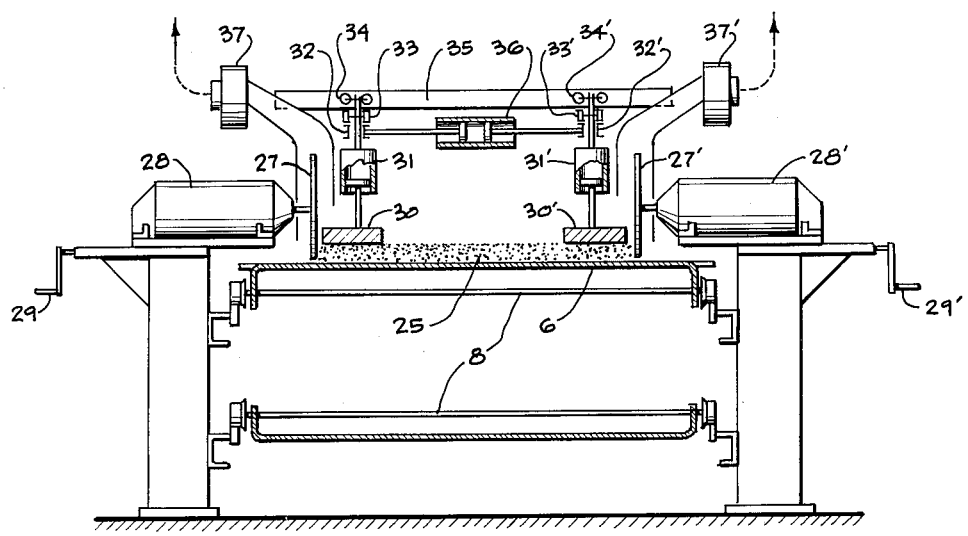
FIG. 6b shows the same device but adjusted for a different width of the mat being produced.

The forming station according to FIG. 1 is further provided with means for trimming the longitudinal edges of the mat pieces. For this purpose, a pair of edge-trimming tools, exemplified by circular saw blades 27, 27' with respective drive motors 28, 28' are located on both sides of the roller conveyor 26 (FIGS. 1, 6a, 6b). The edge trimming tools are adjustable transversely of the conveyor 26 to the particular mat width desired. Such adjustment is effected by means of respective crank drives 29, 29'. Thus, FIG. 6a shows the edge-trimming saws set for a larger mat width than in FIG. 6b.

Pressure beams 30, 30' are placed upon the mat at the beginning of the edge-trimming operation in the same manner as explained above with reference to the transverse cutting operation. During edge trimming, the pressure beams 30, 30' travel in the same direction and at the same speed as the mat. After completion of the edge-trimming operation, the beams return to the starting position. These operations are performed by means of vertical displacing devices 31, 31', shown as hydraulic cylinders, which cooperate with vertical guide means 32, 32', 33, 33', as well as by horizontally acting displacing means 36 and corresponding guide means 34, 34' and 35. The material loosened along the trimmed edges is entrained by pneumatic conveyors 31, 31' to be returned into the fabricating operation.

As exemplified by the funnel devices described above with reference to FIGS. 3 and 4, the invention permits designing the collecting devices alongside of the mat-conveying means in such a manner that the width of the mat being produced can be adjusted merely by displacing the collecting devices as a whole. If desired, such a forming apparatus need not be provided with any displaceable side wall members such as those denoted by 11 and 11'.

As mentioned, the collected excess of stock deposited beyond the desired width of the mat can be effected in such a manner as to keep the collected quantities separated in accordance with their different properties respectively. This, however, is not always necessary but depends upon the operating conditions and type of manufacturing plant to be equipped with a forming station according to the invention. In certain plants, it is desirable or satisfactory, for economical operation, to remove the collected excess material at only one or a few places.

While in the foregoing reference is made to a forming conveyor in which the mat is produced on caul sheets, the use of such cauls is not essential to the invention which is also applicable to mat-supporting devices of any other suitable type, for example, in conjunction with plants in which the mat of particle stock is deposited directly upon an endless belt conveyor. It will further be understood that, while the illustrated mat-forming stations are provided with two particle-collecting devices on the two longitudinal sides of the forming conveyor respectively, it is also possible, though less preferable, to use only one such collecting device on one side of the conveyor so that one longitudinal edge of the mat being produced is always located at the adjacent longitudinal edge of the conveyor surface, whereas the other edge of the mat can be transversely shifted for obtaining a desired width of the mat.

Such and other modifications will readily occur to those skilled in the art upon a study of this disclosure and permit embodying the invention in devices other than those particularly illustrated and described herein, without departing from the essential features of our invention and within the scope of the claims annexed hereto.

We claim:

1. In a mat-forming apparatus for the production of products from particle stock, comprising conveyor means having a traveling horizontal surface, a particle supply device having spreader means above said surface for dispensing thereto a supply of particle stock to form a mat during travel of said surface, said spreader means extending transversely and having a given spreading width; the improvement comprising a catching device which is adapted to intercept and collect particle stock dispensed by the distributor beyond the desired width of the mat, said device comprising particle-collecting container means which during operation remain mounted beneath said spreader means and above said conveyor surface and extend longitudinally along and interposed over a longitudinal marginal surface area of the conveyor means, and particle conveying means extending away from said collecting container means for removing the collected particle stock therefrom, the container means having structure disposed closely adjacent to said marginal surface area and being disposed inwardly of the margin of the conveyor means, so as to determine the width of deposition of stock by the spreader means and define the maximum width of the mat on the conveyor means at the locality of said structure.

2. In a mat-forming apparatus for the production of panels from particle stock, comprising conveyor means having a traveling particle supporting surface, a particle supply device having means above said surface for dispensing thereto a supply of particle stock to form a mat during travel of said surface; the improvement therein comprising a catching device which is adapted to collect particle stock dispensed beyond the desired width of the mat, said device comprising particle-collecting means which during operation remain mounted beneath said dispensing means and above said conveyor surface and extend longitudinally along and interposed over a longitudinal marginal surface area of the conveyor means, and particle conveying means extending away from said collecting means for removing the collected particle stock therefrom, the collecting means having structure disposed closely adjacent to said marginal surface area and being disposed inwardly of the margin of the conveyor means, so as to determine the width of deposition of stock by the spreader means and define the width of the mat on the conveyor means at the locality of said structure.

3. In a mat-forming apparatus for the production of panels from particle stock, comprising conveyor means having a traveling particle supporting surface, a particle supply device having means above said surface for dispensing thereto a supply of particle stock to form a mat during travel of said surface; the improvement therein comprising a catching device which is adapted to collect particle stock dispensed beyond the desired width of the mat, said device comprising particle-collecting means which during operation remain beneath said dispensing means and above said conveyor surface and extend longitudinally along and interposed over a longitudinal marginal surface area of the conveyor means, and particle conveying means extending away from said collecting means for removing the collected particle stock therefrom, the collecting means having structure disposed closely adjacent to said marginal surface area and being disposed inwardly of the margin of the conveyor means, so as to determine the width of deposition of stock by the spreader means and define the width of the mat on the conveyor means at the locality of said structure, there being at least two of the said collecting means, one being at one side of the conveyor means, the other being at the other side, so as to define the width of the mat on the conveyor means thereat.

4. Mat-forming apparatus for the production of panels from particle stock, comprising conveyor means having a traveling horizontal surface, particle supply devices having distributor means above said surface for dispensing thereto a supply of particle stock during travel of said conveyor to form a mat, said distributor means extending transversely and having a given particle distributing width, particle-collecting and intercepting container means mounted beneath said distributor means and extending longitudinally above a marginal surface area of the conveyor means so as to intercept and collect the particle stock dispensed in excess of the desired width of the mat to be produced and so as to define a maximum outer margin on the portion of the mat below the distributor means, said collecting container means being displaceable in transverse direction relative to said conveyor means for adjusting a desired width of the mat to be produced.

5. Mat-forming apparatus for the production of panels from particle stock, comprising conveyor means having a traveling particle supporting surface, particle supply devices having distributor means above said surface for dispensing thereto a supply of particle stock during travel of said conveyor to form a mat, said distributor means extending transversely and having a given particle distributing width, two particle-collecting and intercepting trough means mounted beneath said distributor means on opposite sides with respect to the conveyor means and each extending longitudinally above a marginal surface area of said conveyor means so as to intercept and collect the particle stock dispensed in excess of the desired width of the mat to be produced, the trough means each having a depending wall structure defining a maximum outer margin on a portion of the mat below the distributor means, said collecting means and depending wall structures being displaceable in transverse direction relative to said conveyor means for adjusting to a desired width of the mat to be produced, and means for effecting the displacement.

6. Mat-forming apparatus for the production of panels or other composition products from particle stock, comprising a conveyor having a horizontal surface traveling longitudinally, fixed outer wall members mounted along the two longitudinal sides of said conveyor, particle supply devices having spreader means above the surface of said conveyor means for depositing thereupon a supply of particle stock during travel of said conveyor to form a mat, said spreader means having a given spreading width at least approximately equal to the width of the conveyor surface between said outer wall members, two normally stationary inner wall members extending above the conveyor surface between said two outer members and in parallel relation to said outer members, each outer member and the adjacent inner member forming together with the intermediate conveyor surface zone a trough space longitudinally of said conveyor along a marginal conveyor zone within the depositing range of said spreader means so as to collect the particle stock deposited in excess of the desired width of the mat and to define the maximum outer margin of the mat on the conveyor surface, and means for adjusting said inner wall members transversely of said conveyor to obtain the desired width of the mat to be produced.

7. In mat-forming apparatus according to claim 6 at least one of said inner wall members being angularly adjustable about a pivot axis parallel to the longitudinal direction of said conveyor means.

8. In mat-forming apparatus according to claim 6, at least one of said inner wall members having a wedge-shaped, upwardly tapering cross section.

9. In mat-forming apparatus according to claim 6, said inner walls having a height increasing longitudinally from the start to the end of the depositing range of said spreader means so as to be adapted to the increase in height of the mat along said range.

10. In mat-forming apparatus according to claim 4, said particle-collecting container means comprising a plurality of trough-shaped collecting devices extending longitudinally of said conveyor means for separately collecting respective particle stock of different properties.

11. In mat-forming apparatus according to claim 4, said particle-collecting container means comprising an upwardly widening funnel structure having a top opening whose width is at least equal to the available maximum of transverse displacement of said container means, and a longitudinal wall member extending on top of the conveyor surface adjacent to said funnel structure and being transversely displaceable together with said funnel structure for adjusting said desired width of the mat.

12. In mat-forming apparatus according to claim 4, said particle-collecting container means comprising a plurality of separate, upwardly widening funnel structures on the same longitudinal side of said conveyor means, said funnel structures being individually displaceable transversely of said conveyor means to permit separately collecting quantities of said excessive particle stock according to respectively different particle properties.

13. In mat-forming apparatus according to claim 4, said particle-collecting container means comprising an upwardly widening funnel structure having a top opening whose width is at least equal to the available maximum of transverse displacement of said container means, said funnel structure having a tapering bottom portion extending laterally away from said conveyor means, a longitudinal wall member extending on top of the conveyor surface adjacent to said funnel structure and being transversely displaceable together with said funnel structure for adjusting said desired width of the mat, and a pneumatic conveyor extending from said funnel bottom to said particle supply devices for returning the collected excess of particle material.

14. A mat-forming apparatus according to claim 4, further comprising an edge-trimmer unit having two cutting tools for longitudinally trimming the edges of the mat and having pressure beams seatable upon respective longitudinal marginal zones of the mat adjacent to said respective tools, said tools being transversely displaceable relative to each other, for adaptation to said desired mat width.

15. Mat-forming apparatus for the production of panels from particle stock, comprising conveyor means having a traveling horizontal surface, particle supply devices having particle storage means and having distributor means to receive particle stock from said storage means, said distributor means being mounted above said conveyor surface for dispensing thereto a supply of particle stock during travel of said conveyor to form a mat, said distributor means having a given particle spreading width which is at least approximately equal to the width of said conveyor surface, a catching device which is adapted to collect particle stock dispensed by the distributor means outside of the desired width of the mat, said catching device comprising particle-intercepting and collecting container means mounted beneath said distributor means and above said conveyor surface and extending longitudinally of said conveyor means along opposite marginal conveyor zones within the depositing range of said distributor means, said container means remaining mounted beneath the distributor means and having portions extending above and adjacent to said longitudinal marginal surface zones of the particle conveying means so as to define maximum outer longitudinal margins of the mat, said container means intercepting and collecting the particle stock distributed in excess of the desired width of the mat to be produced, and thus determining the depositing width, and particle conveying means extending from said collecting container means to said storage means for returning the collected excess of particle stock back to said storage means.

16. Mat-forming apparatus for the production of panels or other composition products from particle stock, comprising a conveyor having a horizontal surface traveling longitudinally, fixed outer wall members mounted along the two longitudinal sides of said conveyor, particle supply devices having spreader means above the surface of said conveyor means for depositing thereupon a supply of particle stock during travel of said conveyor to form a mat, said spreader means having a given spreading width at least approximately equal to the width of the conveyor surface between said outer wall members, two normally stationary inner wall members extending above the conveyor surface between said two outer members and in parallel relation to said outer members, each outer member and the adjacent inner member forming together with the intermediate conveyor surface zone a trough space longitudinally of said conveyor along a marginal conveyor zone within the depositing range of said spreader means so as to collect the particle stock deposited in excess of the desired width of the mat and to define the maximum outer margin of the mat on the conveyor surface, and means for adjusting said inner wall members transversely of said conveyor to obtain the desired width of the mat to be produced, an edge-trimmer device having two cutting tools for longitudinally trimming the edges of the mat, said tools being transversely displaceable relative to each other for adaptation to said desired mat width.

17. Mat-forming apparatus for the production of panels or other composition products from particle stock, comprising horizontal surface conveyor means, particle supply devices having a plurality of spreader means longitudinally spaced from each other above the surface of said conveyor means for separately depositing thereupon respectively different supplies of particle stock during travel of said conveyor to form a mat on the conveyor surface, said spreader means having a given spreading width approximately equal to the width of the conveyor surface, a plurality of particle collecting and intercepting containers mounted beneath said spreader means and extending longitudinally of said conveyor along a longitudinal marginal conveyor zone within the depositing range of said spreader means, said container means having portions extending above and adjacent to said longitudinal marginal surface zone of the conveyor so as to define a maximum outer longitudinal margin on the portion of the mat below the spreader means, so as to intercept and collect the particle stock spread in excess of the desired width of the mat to be produced, said plurality of collecting containers being spaced from each other longitudinally of said conveyor means so as to collect stock from different ones of said respective spreader means, and a plurality of particle conveying means extending separately from said respective collecting containers to said supply devices.

References Cited in the file of this patent

UNITED STATES PATENTS

| | | |
|---|---|---|
| 2,441,235 | Blair et al. | May 11, 1948 |
| 2,743,758 | Uschmann | May 1, 1956 |
| 2,822,028 | Himmelheber et al. | Feb. 4, 1958 |
| 2,845,662 | Clark | Aug. 5, 1958 |